Dec. 5, 1939.  F. V. A. E. ENGEL  2,182,771
CONTROL SYSTEM
Filed Dec. 1, 1937  2 Sheets-Sheet 1
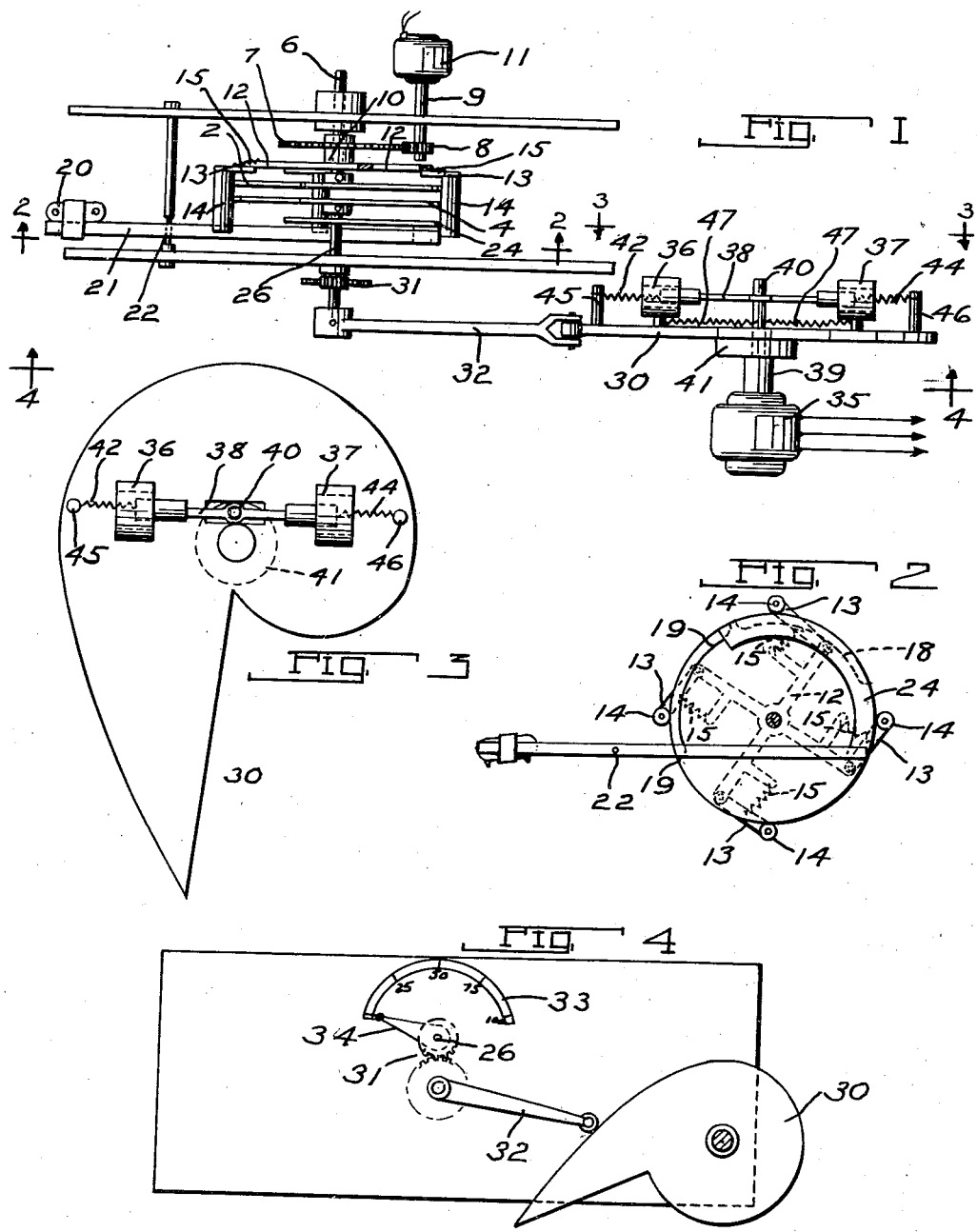
INVENTOR.
FRIEDRICH VIKTOR ANTON ERNST ENGEL
BY McConkey Dawson & Booth
ATTORNEYS.

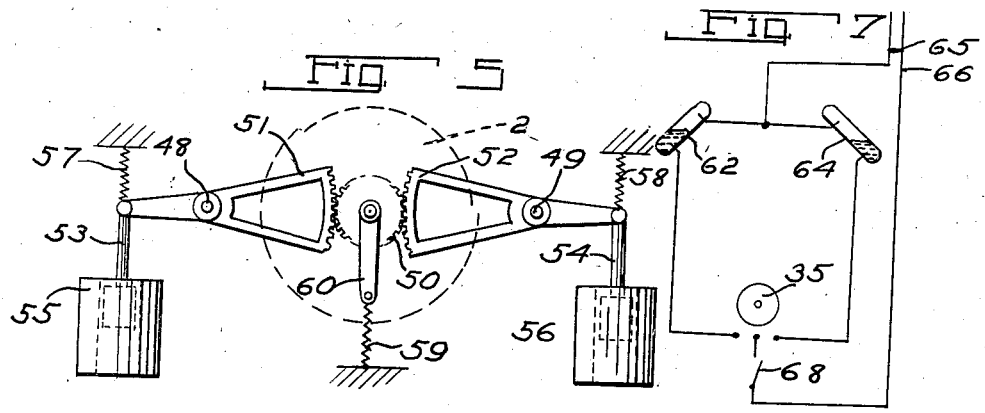
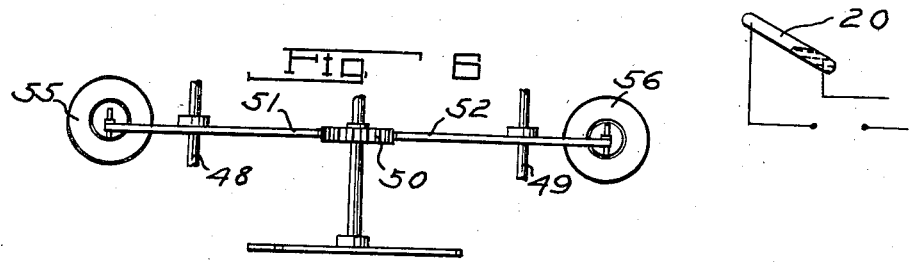
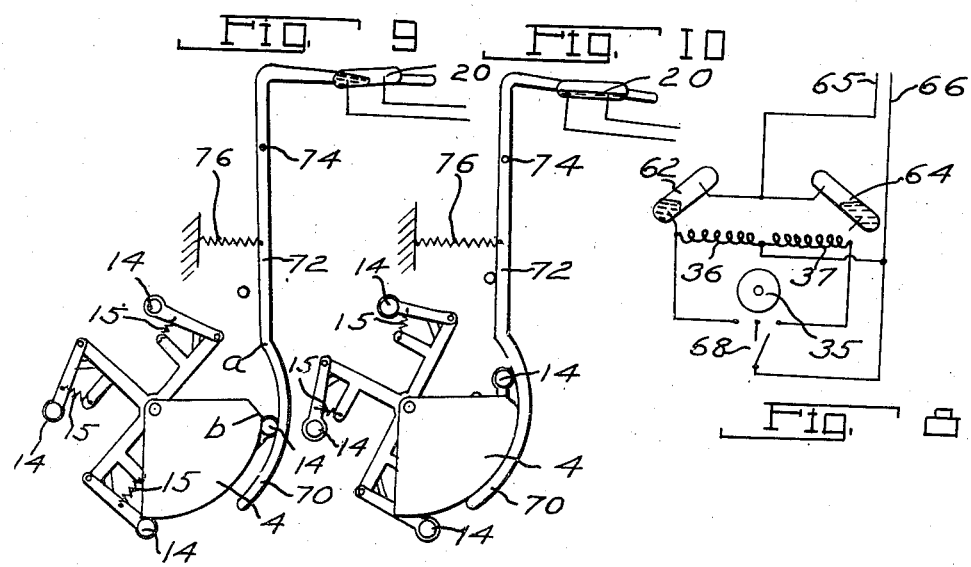

Patented Dec. 5, 1939

2,182,771

UNITED STATES PATENT OFFICE 2,182,771

CONTROL SYSTEM

Friedrich Viktor Anton Ernst Engel, London, England, assignor to Republic Flow Meters Company, Chicago, Ill., a corporation of Illinois Application December 1, 1937, Serial No. 177,500
In Great Britain March 25, 1937

24 Claims. (Cl. 74—1)

This invention relates to control systems for controlling a variable characteristic or physical condition such as pressure or temperature.

The invention has particular reference to temperature control systems intended for use with electrically heated units or furnaces although it may also be applied to other control systems or to heating units or furnaces supplied with a gaseous or liquid fuel.

The primary object of the invention is to provide an improved form of regulating device for a temperature or other control system by which there can be obtained a series of controlling impulses the durations, in relation to a given time interval, of which are adapted to be varied according to the rate of input desired or to the extent of deviation of the temperature or other characteristic from a predetermined value or range of values.

According to one feature of the invention the regulator comprises a rotary member provided with means arranged for movement at a constant speed along a circular path, means operable to cause the first mentioned means during a portion of a rotation to be deflected or diverted from its circular path of movement and a periodically operable switch or other input regulating member adapted to be actuated by the first mentioned means during movement along the deflected or diverted path.

The means arranged for movement along a circular path may conveniently comprise a plurality of rollers carried by a disc or spider in such a manner that provision is made for a limited amount of movement of the rollers in a direction towards or away from the axis of rotation of the disc or spider.

The above and other objects and novel features of the invention will be more apparent from the following description of the illustrative embodiment shown in the accompanying drawings, in which:

Fig. 1 is a view partially in section and partially in plan of one convenient mode of carrying the invention into effect;

Fig. 2 is a section on the line 2—2 of Fig. 1;

Fig. 3 is an elevation of the right side of Fig. 1 looking in the direction of arrows 3—3;

Fig. 4 is a section on the line 4—4 of Fig. 1;

Figs. 5 and 6 illustrate diagrammatically another means which may be employed for obtaining a rapid change of setting;

Fig. 7 is one form of circuit diagram for the arrangement shown in Figs. 1 to 4;

Fig. 8 is another form of circuit diagram for the arrangement shown in Figs. 1 and 4, and Figs. 9 and 10 illustrate diagrammatically another mode of carrying the invention into effect.

In the arrangement illustrated in Figs. 1 to 4, there are provided two parallel and co-axially disposed plates or cams one of which, viz. that indicated at 2, is fixed and the other of which, namely the plate 4, is mounted so as to be capable of angular displacement. Coaxially arranged with respect to the plates 2 and 4 is a spindle 6 adapted to be driven at a constant speed as, for example, by a gear wheel 7 and a pinion 8 connected by suitable means such as a shaft to a constant speed motor 11. The spindle 6 carries a bush or disc 10 provided with a plurality of radially disposed arms 12 each provided at its outer end with a pivotally mounted lever 13 carrying a roller 14. The rollers are arranged with their axes parallel with that of the spindle 6 and means such as springs 15 are provided to urge the rollers inwardly or towards the axis of rotation. The parts are dimensioned and arranged so that the rollers are carried around the plates 2 and 4 and throughout their movements are pressed against the peripheries of the said plates. Also, each of the said plates is recessed over a part of its periphery, the arrangement being such that, by the displacement of the movable plate 4, the recesses of the two plates can be brought into or out of registration or alignment. In the particular embodiment shown, the fixed plate is formed with a recess 18 of approximately 90° angular extent and the movable plate is formed with a similar recess 19 also approximately of 90° angular extent, this arrangement being the most suitable for a four roller arrangement such as that illustrated, but it is to be understood that the number of rollers employed and the arcuate extents of the recesses may be varied to suit the conditions to be complied with.

From the foregoing, it will be appreciated that, if the movable plate 4 is displaced (e. g. through an angle of approximately 90° from the position shown in Fig. 2) to bring its recess 19 opposite the recess 18 so that the recesses are aligned with one another throughout their entire lengths, the rollers 14 will, for approximately 90° of their movement, move inwardly or to be deflected from their normal path of movement and that, if the recesses are only partially aligned, the angular extent of the deflected movement of the rollers will correspond with the extent of the gap provided by those parts of the recesses which are aligned or opposite one another. Also, if the movable plate is arranged so the forward end of its recess is disposed opposite the rear end of the recess of the fixed plate as is shown, for example, in Fig. 2, the rollers will not be deflected out of their normal circular path of movement.

In applying the above arrangement to a temperature control system, the inward or deflected movements of the rollers 14 are utilized to operate, or to cause the operation of, an intermittently operable regulating means such as, for example, a switch or switches for regulating the supply of heating current to a furnace or to adjust or turn on and off a valve or valves for regulating the supply of fuel or fuel and air and the duration of the periods of operation of the regulating means as determined by the extent or length of deflected movement during each circular movement of the rollers are varied by the displacement of the recess 19 relatively to the recess 18. For example, a switch tripping means may be provided so that it is adapted to be actuated by a roller while traversing a deflected path. In the arrangement shown in Fig. 1, there is provided a mercury switch 20 such as may be used for turning on and off the supply of heating current to a furnace, the said switch being carried by one end of a lever 21 which is pivoted at 22 and is connected at its opposite end to a plate 24 of arcuate formation arranged with its outer peripheral surface adjacent the peripheries of the plate or cams 2 and 4 so that, when a roller enters the gap formed by aligned parts of the recesses 18 and 19, it will bear against the plate 24 and tilt the lever 21 to actuate the switch or other heat input regulation means.

While the displacement of the movable plate or cam 4 may be effected by manually operable means, it is preferred to provide automatic means for this purpose. For example, the spindle 26 to which the plate 4 is secured may be connected by gearing or other suitable means to a reversible electric motor 35 controlled by a pyrometer or other means responsive to the condition to be controlled so that the plate is adapted to be moved in one direction when the temperature within the furnace or other heating unit is below a predetermined value and in the opposite direction when the temperature is above a predetermined value, the arrangement being such that there is an intervening range of temperature when the motor and the plate are stationary. In most instances, it is advisable that the gearing or coupling between the plate 4 and the reversible motor 35 shall have a variable transmission ratio so that, for example, each increment of movement of the plate is adapted to produce the same or approximately the same percentage increase or decrease in the furnace input i. e. the same or approximately the same percentage increase or decrease in the duration of the period for which the regulating means is operative. For this purpose, the reversible motor may be provided with a cam 30 and the spindle 26 of the plate 4 may be coupled by gearing 31 to a follower 32. In order to indicate the percentage input to the furnace at any instant, a scale 33 may be attached to the front mounting plate of the regulator and a pointer 34 may be fixed to the spindle 26 of the movable plate or cam 4.

In some instances, it is desirable for provision to be made for enabling a rapid or large change in the instantaneous value of the furnace input to be obtained and, with an arrangement such as that illustrated in Figs. 1 to 4, this may be accomplished by displacing the cam 30 through a predetermined angle relatively to the spindle by which it is carried. For this purpose, the cam may be loosely mounted in position on the shaft 39 which is adapted to be driven by the reversible electric motor 35 and means such as one or more switches (not shown) may be provided so that at the appropriate time it or they can be brought into operation to cause a displacement of the cam in relation to said spindle. For instance, the cam may be provided with a plurality of electrical means such as solenoids 36 and 37 (two being shown) the cores of pairs of which may be inter-connected by a rod 38 connected at or near its mid point with a pin 40 carried by a collar 41 which is secured to the shaft 39, the said cores being normally held in position by a pair of tensioned springs 42 and 44 secured to fixing posts 45 and 46 mounted in position on the cam. By this arrangement, when any one of the solenoids is energized, a torque will be produced and the cam will be quickly displaced by a predetermined amount relatively to the shaft by which it is normally moved to bring the same and the movable plate or cam 4 to a new setting, the springs operating to return the cam and the plate to their normal settings immediately the solenoid is de-energized. If desired, a further spring or springs 47 may be provided between the pin 40 and a convenient part of the cam for restoring the latter to its former or normal position. Thus, it will be seen that the cam is displaceable in two directions by each pair of solenoids and may occupy any number of alternative positions relatively to its operating shaft or spindle depending upon the number of solenoids employed. The switches for operating the solenoids may be adapted to be brought into operation by a controller according to the extent of deviation of the temperature.

It will be appreciated that various other means may be employed for obtaining a rapid or large change in the instantaneous value of the furnace input. For example, the plate or cam 2, instead of being fixed in its mounting, may be arranged so as to be capable of being moved about the axis of rotation of the rollers 14 to increase or decrease the length of the gap provided by the aligned parts of the recesses 18 and 19. One means suitable for accomplishing this purpose is shown in Figs. 5 and 6 wherein the plate or cam 2 is provided with a pinion 50 meshing with two toothed sectors 51 and 52 pivoted at 48 and 49, the ends of said sectors being connected with electrical means such as the cores 53 and 54 of a pair of solenoids 55 and 56 held in their normal positions within the solenoids by a pair of springs 57 and 58.

Thus, when either of the solenoids is energized, the toothed sector associated with that solenoid will be displaced about its pivot and the plate 2 will be rapidly swung into a new position to increase or decrease the length of the aforesaid gap. An additional spring 59 may also be provided on an arm 60 carried by the pinion 50 for the purpose of returning the parts to their normal positions when the solenoid is de-energized. The solenoids may be arranged to be brought into operation in known manner by a controller according to the degree of deflection of a pointer or index. If desired, the solenoids may be replaced by other means for furnishing an additional opening or closing of the gap provided by the recesses 18 and 19.

In Fig. 7 there is shown a circuit diagram suitable for an arrangement such as that shown in Figs. 1 to 4 provided with a reversible motor for effecting the displacement of the movable plate or cam. In this diagram, 20 denotes the mercury switch which is arranged in the heating circuit of an electrically heated furnace or the like to cause a change in the condition to be controlled and which is adapted to be actuated by the rollers 14 while traversing the path afforded by the aligned portions of the recesses 18 and 19. Also, 35 denotes the reversible electric motor adapted to be actuated in one direction or the other through a controller comprising a pair of mercury switches 62 and 64 one of which is adapted to be operated, for example, when the temperature within the furnace to be controlled as recorded by a pyrometer connected with the leads 65 and 66 is too high and other of which is adapted to be operated when the temperature is too low.

In the diagram, both switches are shown in their off position which corresponds with the intervening range of the controller when the motor and the plate 4 are stationary. If desired, the reversible motor may be provided in its common lead 66 with a switch 68 for enabling the speed or average speed of the motor to be varied to suit the conditions to be complied with, the switch being operated by known means enabling contact to be made and broken over a predetermined time cycle and the arrangement being adjustable so that during the cycle the switch may be closed for a short or a long interval of time.

In instances in which solenoids are employed for the purpose of effecting a rapid change in the instantaneous value of the input, the solenoid coils 36 and 37 should be arranged in parallel with the field windings of the reversible motor as is shown, for example, in Fig. 8.

As an example of another means which may be employed for the purpose of deflecting or diverting the rollers from their normal path of movement and for utilizing the deflected or diverted movement for the actuation of a heat input regulating means, there is shown in Figs. 9 and 10 a modified arrangement in which the rollers are adapted to be moved or deflected outwardly instead of inwardly as in the arrangement shown in Fig. 1. As, in the preceding instance, the rollers 14 are caused to traverse a circular path and are urged towards the axis of rotation by springs 15. The rollers may, if desired, be arranged to ride on the circumference of a fixed plate as in the preceding arrangement but as, in this instance, the fixed plate is not essential, it has been omitted from the illustrated arrangement. Also, the movable plate 4 is, in this instance, of segmental formation and, in cases in which four rollers are provided, is preferably in the form of a quadrant. Opposite the curved peripheral surface of the quadrant is arranged an arcuate member or strip 70 forming one end of a lever 72 which is pivotally mounted at 74 and is provided at its opposite end with the switch 20, e. g. a mercury switch, arranged in the input circuit of the furnace or heating unit, the said lever being provided with resilient means such as a spring 76 urging the inner curved surface of the arcuate member or strip into contact with the outer curved surface of the quadrant as shown in Fig. 10. The rollers 14 are arranged to rotate in a clockwise direction and each of them upon arriving at the leading or chamfered edge 77 of the quadrant is deflected or moved outwardly from its circular path of movement to traverse the path defined by the curved peripheral surface of the quadrant. In so doing, the rollers move the lever about its pivotal mounting and actuate the switch. As in the arrangement described with reference to Fig. 1, the plate 4 is mounted so as to be capable of angular movement about the axis of rotation of the rollers to permit the duration of the switch actuation or heating impulse to be varied.

In this connection, it will be seen that when the point b on the quadrant is brought into a position opposite the point a on the lever, the rotating rollers while traversing the path between the outer curved peripheral surface of the quadrant and the inner curved surface of the arcuate strip, will maintain the lever in its deflected position shown in Fig. 9 and will thus break the switch which operates the furnace and that, by displacement of the quadrant in a clockwise direction, the period during which the lever is deflected may be varied and the switch actuated to make contact to an extent corresponding with the angular displacement between the points a and b. It will also be noted that, in this instance, the period during which the rollers traverse a diverted or deflected path is constant and not variable as in the arrangement shown in Figs. 1 and 2 and that the variations in the duration of the impulses are obtained by varying the position of the movable plate relatively to an angularly displaceable member or lever arranged adjacent the movable plate for the actuation of the heat input regulating means. Here again, the displacement of the movable plate is preferably effected by automatic means such as a reversible electric motor coupled with the plate by means such as a cam affording a variable transmission ratio.

From the foregoing it will be appreciated that the invention provides a simple and convenient form of temperature control system by which a switch or other form of heat regulating device can be operated intermittently so that the heating is effected in surges the duration of which can be controlled to any desired extent. In other words, the amount of the input or the length of the impulse given at any time is not fixed as is normally the case with a controller of the "on and off" type but is adjustable according to the extent to which the temperature deviates from a predetermined value or range of values. It will also be appreciated that although the circuit diagrams shown in Figs. 7 and 8 show only two switches for the controller, the latter may, if desired, be provided with a larger number of switches so that when a large temperature variation occurs additional switches can be brought into operation to adjust the input.

While several illustrative embodiments have been shown and described it is not intended that the invention be limited to the forms shown, nor otherwise than by the terms of the appended claims.

What is claimed is:

1. A control system for the regulation of a variable characteristic comprising a rotary member provided with means arranged for movement at a constant speed along a circular path, means operable to cause the first mentioned means during a portion of a rotation to be deflected from its circular path of movement and periodically operable means for varying the characteristic to be controlled adapted to be operated by the first mentioned means during movement along the deflected path.

2. A control system for the regulation of a variable characteristic comprising a rotary member provided with means arranged for movement at a constant speed along a circular path, means operable to cause the first-mentioned means during a portion of a rotation to be deflected from its circular path of movement, and periodically operable means for varying the characteristic to be controlled adapted to be operated by the first mentioned means, the period or interval over which the last named means is operable or rendered inoperable depending on the amount of displacement of the deflecting means from its zero position.

3. A control system for the regulation of a variable characteristic comprising a rotary member provided with means arranged for movement at a constant speed along a circular path, means operable to cause the first mentioned means during a portion of a rotation to be deflected from its circular path of movement and a periodically operable means for varying the characteristic to be controlled adapted to be operated by the first mentioned means during movement along the deflected path, said first named means comprising a plurality of members, carried by a disc in such a manner that provision is made for a limited amount of movement of such members in a direction towards or away from the axis of rotation of the disc.

4. A control system for the regulation of a variable characteristic comprising a rotary member provided with means arranged for movement at a constant speed along a circular path, means operable to cause the first mentioned means during a portion of a rotation to be deflected from its circular path of movement and periodically operable means for varying the characteristic to be controlled adapted to be operated by the first mentioned means during movement along the deflected path, the period of rotary movement during which said means for varying the characteristic is operated being governed by the length of the deflected or diverted path.

5. A control system for the regulation of a variable characteristic comprising a rotary member provided with means arranged for movement at a constant speed along a circular path, means operable to cause the first mentioned means during a portion of a rotation to be deflected from its circular path of movement, periodically operable means for varying the characteristic to be controlled adapted to be operated by the first mentioned means during movement along the deflected path, the period of rotary movement during which said means for varying the characteristic is operated or rendered inoperable being governed by the relative positions of the deflecting means and a member with which said means for varying the characteristics is operatively connected.

6. A control system for the regulation of a variable characteristic comprising a rotary member provided with means arranged for movement at a constant speed along a circular path, means operable to cause the first mentioned means during a portion of a rotation to be deflected from its circular path of movement, periodically operable means for varying the characteristic to be controlled adapted to be operated by the first mentioned means during movement along the deflected path and a pair of parallel and coaxially disposed discs around the peripheries of which the members arranged for movement in a circular path are propelled so that they are maintained in contact therewith, the said discs being formed with peripheral recesses which can be brought into different amounts of alignment to provide a gap affording a diverted path for the said members.

7. A control system for the regulation of a variable characteristic comprising a rotary member provided with means arranged for movement at a constant speed along a circular path, means operable to cause the first mentioned means during a portion of a rotation to be deflected from its circular path of movement, periodically operable means for varying the characteristic to be controlled adapted to be operated by the first mentioned means during movement along the deflected path, a pair of parallel and coaxially disposed discs around the peripheries of which the members arranged for movement in a circular path are propelled so that they are maintained in contact therewith, the said discs being formed with peripheral recesses which can be brought into different amounts of alignment to provide a gap affording a diverted path for the said members, means for enabling relative movement to be obtained between the discs for the purpose of varying the length of the said gap.

8. A control system for the regulation of a variable characteristic comprising a rotary member provided with means arranged for movement at a constant speed along a circular path, means operable to cause the first mentioned means during a portion of a rotation to be deflected from its circular path of movement, periodically operable means for varying the characteristic to be controlled adapted to be operated by the first mentioned means during movement along the deflected path and a pair of parallel and coaxially disposed discs around the peripheries of which the members arranged for movement in a circular path are propelled so that they are maintained in contact therewith, the said discs being formed with peripheral recesses which can be brought into different amounts of alignment to provide a gap affording a diverted path for the said members, said means for varying the length of the gap afforded by the recesses being automatically controlled by a device incorporating a low contact, a high contact and an intervening range between both high and low contacts.

9. A control system for the regulation of a variable characteristic comprising a rotary member provided with means arranged for movement at a constant speed along a circular path, means operable to cause the first mentioned means during a portion of a rotation to be deflected from its circular path of movement, periodically operable means for varying the characteristic to be controlled adapted to be operated by the first mentioned means during movement along the deflected path and a pair of parallel and coaxially disposed discs around the peripheries of which the members arranged for movement in a circular path are propelled so that they are maintained in contact therewith, the said discs being formed with peripheral recesses which can be brought into different amounts of alignment to provide a gap affording a diverted path for the said members said means for varying the length of the gap afforded by the recesses being automatically controlled by a device incorporating a series of low contacts, a series of high contacts and an intervening range between both high and low contacts.

10. A control system for the regulation of a variable characteristic comprising a rotary member provided with means arranged for movement at a constant speed along a circular path, means operable to cause the first mentioned means during a portion of a rotation to be deflected from its circular path of movement, periodically operable means for varying the characteristic to be controlled adapted to be operated by the first mentioned means during movement along the deflected path, a pair of parallel and coaxially disposed discs around the peripheries of which the members arranged for movement in a circular path are propelled so that they are maintained in contact therewith, the said discs being formed with peripheral recesses which can be brought into different amounts of alignment to provide a gap affording a diverted path for the said members, means for enabling relative movement to be obtained between the discs for the purpose of varying the length of the said gap and a reversible electric motor adapted to displace one of the discs relatively to the other to vary the length of the gap, the arrangement being such that displacement is effected in one direction when the characteristic to be controlled drops below a predetermined value and in the opposite direction when the characteristic is above a predetermined value and such that there is an intervening range of change of characteristic in which no displacement occurs.

11. A control system for the regulation of a variable characteristic comprising a rotary member provided with means arranged for movement at a constant speed along a circular path, means operable to cause the first mentioned means during a portion of a rotation to be deflected from its circular path of movement, periodically operable means for varying the characteristic to be controlled adapted to be operated by the first mentioned means during movement along the deflected path, and a pair of parallel and coaxially disposed discs around the peripheries of which the members arranged for movement in a circular path are propelled so that they are maintained in contact therewith, the said discs being formed with peripheral recesses which can be brought into different amounts of alignment to provide a gap affording a diverted path for the said members, one of said discs and its displacing means being coupled by means having a variable transmission ratio.

12. A control system for the regulation of a variable characteristic comprising a rotary member provided with means arranged for movement at a constant speed along a circular path, means operable to cause the first mentioned means during a portion of a rotation to be deflected from its circular path of movement, periodically operable means for varying the characteristic to be controlled adapted to be operated by the first mentioned means during movement along the deflected path, and a pair of parallel and coaxially disposed discs around the peripheries of which the members arranged for movement in a circular path are propelled so that they are maintained in contact therewith, the said discs being formed with peripheral recesses which can be brought into different amounts of alignment to provide a gap affording a diverted path for the said members, one of said discs and its displacing means being coupled by means having a variable transmission ratio, said variable transmission ratio being such that each increment of movement of its disc in a predetermined time interval is adapted to produce the same or approximately the same percentage change in the furnace input.

13. A control system for the regulation of a variable characteristic comprising a rotary member provided with means arranged for movement at a constant speed along a circular path, means operable to cause the first mentioned means during a portion of a rotation to be deflected from its circular path of movement, periodically operable means for varying the characteristic to be controlled adapted to be operated by the first mentioned means during movement along the deflected path, and a pair of parallel and coaxially disposed discs around the peripheries of which the members arranged for movement in a circular path are propelled so that they are maintained in contact therewith, the said discs being formed with peripheral recesses which can be brought into different amounts of alignment to provide a gap affording a diverted path for the said members, means for enabling relative movement to be obtained between the discs for the purpose of varying the length of the said gap, and a reversible electric motor adapted to displace one of the discs relatively to the other to vary the length of the gap, the arrangement being such that displacement is effected in one direction when the characteristic to be controlled drops below a predetermined value and in the opposite direction when the characteristic is above a predetermined value and such that there is an intervening range of change of characteristic in which no displacement occurs, said disc being connected with the reversible electric motor by a cam and cam follower mechanism.

14. A control system for the regulation of a variable characteristic comprising a rotary member provided with means arranged for movement at a constant speed along a circular path, means operable to cause the first mentioned means during a portion of a rotation to be deflected from its circular path of movement, said last named means including a stationary cam disc and a movable cam disc periodically operable means for varying the characteristic to be controlled adapted to be operated by the first mentioned means during movement along the deflected path and means for enabling an additional change to be effected in the relative displacement of the movable disc to the stationary disc.

15. A control system for the regulation of a variable characteristic comprising a rotary member provided with means arranged for movement at a constant speed along a circular path, means operable to cause the first mentioned means during a portion of a rotation to be deflected from its circular path of movement, periodically operable means for varying the characteristic to be controlled adapted to be operated by the first mentioned means during movement along the deflected path, and means for enabling a rapid or large change in the instantaneous value of the input to be obtained.

16. A control system for the regulation of a variable characteristic comprising a rotary member provided with means arranged for movement at a constant speed along a circular path, means operable to cause the first mentioned means during a portion of a rotation to be deflected from its circular path of movement, periodically operable means for varying the characteristic to be controlled adapted to be operated by the first mentioned means during movement along the deflected path, and a series of means for enabling changes in the instantaneous value of the input to be obtained, the means being arranged such that they co-operate or counteract one another.

17. A control system for the regulation of a variable characteristic comprising a rotary member provided with means arranged for movement at a constant speed along a circular path, means operable to cause the first mentioned means during a portion of a rotation to be deflected from its circular path of movement, periodically operable means for varying the characteristic to be controlled adapted to be operated by the first mentioned means during movement along the deflected path, and a pair of parallel and coaxially disposed discs around the peripheries of which the members arranged for movement in a circular path are propelled so that they are maintained in contact therewith, the said discs being formed with peripheral recesses which can be brought into different amounts of alignment to provide a gap affording a diverted path for the said members, one of said discs and its displacing means being coupled by means having a variable transmission ratio, and means adapted at the appropriate time to be brought into operation to vary the transmission ratio of the coupling between one of said discs and its actuating means.

18. A control system for the regulation of a variable characteristic comprising a rotary member provided with means arranged for movement at a constant speed along a circular path, means operable to cause the first mentioned means during a portion of a rotation to be deflected from its circular path of movement, periodically operable means for varying the characteristic to be controlled adapted to be operated by the first mentioned means during movement along the deflected path, and a pair of parallel and coaxially disposed discs around the peripheries of which the members arranged for movement in a circular path are propelled so that they are maintained in contact therewith, the said discs being formed with peripheral recesses which can be brought into different amounts of alignment to provide a gap affording a diverted path for the said members, means for enabling relative movement to be obtained between the discs for the purpose of varying the length of the said gap, a reversible electric motor adapted to displace one of the discs relatively to the other to vary the length of the gap, the arrangement being such that displacement is effected in one direction when the characteristic to be controlled drops below a predetermined value and in the opposite direction when the characteristic is above a predetermined value and such that there is an intervening range of change of characteristic in which no displacement occurs, said disc being connected with the reversible electric motor by a cam and cam follower mechanism, and means whereby the said cam is adapted to be displaced relatively to its driving spindle.

19. A control system for the regulation of a variable characteristic comprising a rotary member provided with means arranged for movement at a constant speed along a circular path, means operable to cause the first-mentioned means during a portion of a rotation to be deflected from its circular path of movement, periodically operable means for varying the characteristic to be controlled adapted to be operated by the first mentioned means, the period or interval over which the last named means is operable or rendered inoperable depending on the amount of displacement of the deflecting means from its zero position, and means operable to effect a rapid or large displacement of the deflecting means.

20. A control system for the regulation of a variable characteristic comprising a rotary member provided with means arranged for movement at a constant speed along a circular path, means operable to cause the first mentioned means during a portion of a rotation to be deflected from its circular path of movement, periodically operable means for varying the characteristic to be controlled adapted to be operated by the first mentioned means during movement along the deflected path, and a pair of parallel and coaxially disposed discs around the peripheries of which the members arranged for movement in a circular path are propelled so that they are maintained in contact therewith, the said discs being formed with peripheral recesses which can be brought into different amounts of alignment to provide a gap affording a diverted path for the said members, means for enabling relative movement to be obtained between the discs for the purpose of varying the length of the said gap, and a reversible electric motor adapted to displace one of the discs relatively to the other to vary the length of the gap, the arrangement being such that displacement is effected in one direction when the characteristic to be controlled drops below a predetermined value and in the opposite direction when the characteristic is above a predetermined value and such that there is an intervening range of change of characteristic in which no displacement occurs, said disc being connected with the reversible electric motor by a cam and cam follower mechanism, and means whereby the said cam is adapted to be displaced relatively to its driving spindle, said last named means being adapted to be brought into operation by electrical means controlled by a controller operable according to the extent of variation of the characteristic.

21. A control system for the regulation of a variable characteristic comprising a rotary member provided with means arranged for movement at a constant speed along a circular path, means operable to cause the first-mentioned means during a portion of a rotation to be deflected from its circular path of movement, periodically operable means for varying the characteristic to be controlled adapted to be operated by the first mentioned means, the period or interval over which the last named means is operable or rendered inoperable depending on the amount of displacement of the deflecting means from its zero position, and means operable to effect a rapid or large displacement of the deflecting means said last named means being adapted to be brought into operation by electrical means controlled by a controller operable according to the extent of variation of the characteristic.

22. A control system for the regulation of a variable characteristic comprising means arranged for movement along a circular path, means operable to cause the first mentioned means during a portion of a rotation to be deflected from its circular path and an intermittently operable input regulating member adapted to be actuated during a selectable portion of the movement along the deflected path.

23. A control system for the regulation of a variable characteristic comprising a plurality of members moving during a part of a rotary movement along an arcuate path, a displaceable cam adapted to vary the path of movement of said members, an intermittently operable input regulating member adapted to be actuated during a selectable portion of the movement along the deflected path and a lever for controlling the operation of the switch input regulating member, the arrangement being such that the portion of the rotary movement during which the input regulating member, is operable is dependent upon the position of the displaceable cam relatively to the lever.

24. A control system comprising an intermittently operable switch, cam means for controlling the duration of operation of said switch, means for controlling automatically according to the magnitude of change of the characteristic to be controlled effective length of the cam means, and a coupling means having a variable transmission ratio between the cam means and the means for varying the effective length thereof.

FRIEDRICH VIKTOR
ANTON ERNST ENGEL.